(No Model.)
M. J. POWER.
PROCESS OF EXTRACTING THE CONTENTS OF EGGS.
No. 498,488. Patented May 30, 1893.
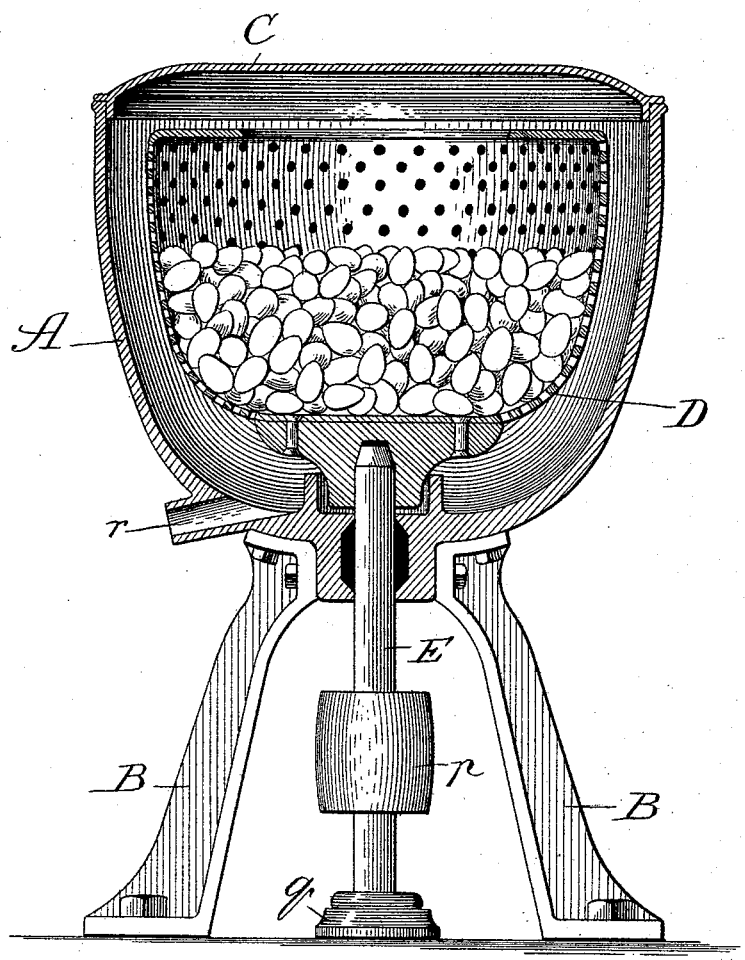
Witnesses:
Geo. S. Gaylord,
Clifford N. White.
Inventor:
Martin J. Power,
By Dyrenforth & Dyrenforth,
Attys.

UNITED STATES PATENT OFFICE.

MARTIN J. POWER, OF CHICAGO, ILLINOIS.

PROCESS OF EXTRACTING THE CONTENTS OF EGGS.

SPECIFICATION forming part of Letters Patent No. 498,488, dated May 30, 1893.

Application filed September 12, 1892. Serial No. 445,621. (No model.)

*To all whom it may concern:*

Be it known that I, MARTIN J. POWER, a citizen of the United States, residing at Chicago, in the county of Cook and State of Illinois, have invented a new and useful Improvement in Processes of Extracting the Contents of Eggs, of which the following is a specification.

My invention relates to an improved process, whereby the contents, (meaning thereby the whites and yelks) of raw eggs may be extracted expeditiously, thoroughly and in a cleanly manner.

The industry of supplying the contents of eggs, beaten up and frozen, to preserve them, to consumers, particularly bakers who use the product for frosting and other purposes, has grown to one of considerable importance. It is customary to gage the contract price for the supply according to the weight of the extracted product under the stipulation that each dozen of eggs shall produce a certain weight of the product. Accordingly it is an object with the dealer who furnishes the supply to obtain the largest possible quantity of the contents of eggs.

Hitherto the method most commonly resorted to for separating the contents of eggs from their shells has been the primitive one of breaking the shells by hand and emptying them of their contents, a force of boys and girls being employed to do the work. This method is expensive, not only because of the amount of help required to practice it, but because of the waste which ensues owing to the practical impossibility of thoroughly evacuating the shells.

By my improved process, hereinafter described, I am enabled to discharge the contents of raw eggs economically in every sense of the word, since it is expeditious, thorough and cleanly.

I have discovered that by subjecting eggs to the action of centrifugal force, as in an ordinary or any suitable centrifugal machine, such, for example, as is used in laundries for drying clothes, and which I may fill to any desired extent with the eggs to be treated, the centrifugal action will crack the shells sufficiently to permit their contents to discharge, and will discharge them so thoroughly and completely, that the refuse of shells will contain no remnant or material remnant of the original white and yelks.

Accordingly, my invention consists, in its broadest sense, in extracting the contents of eggs from their shells, by subjecting them to the action of centrifugal force.

In the accompanying drawing, I show, by a view in sectional elevation, a well known form of centrifugal machine which I may use for the practice of my invention.

A is an outer imperforate, bowl-shaped receptacle supported on a suitable stand B, and provided with a removable cover C, and, at its base, with a discharge outlet $r$. Within the receptacle A is a perforated horizontally rotary receptacle D, which should be at least partially covered, as represented, and rotation of which inside the imperforate receptacle A is produced by the rapid revolution of a vertical shaft E secured, at its upper end, to the base of the inner receptacle to which it extends through the base of the outer receptacle, forming one journal bearing for it; the journal bearing for the lower end of the shaft is shown as provided in a step $q$. A belt-pulley $p$ is provided on the shaft to afford the medium for driving it from a suitable power, not shown.

The eggs to be treated are placed inside the inner perforate receptacle D in number, preferably, to fill it half full, more or less. By then rotating the receptacle D at a high rate of speed, the centrifugal action exerted on the eggs will slightly crack the shells and empty them of their contents, which will be forced through the pile of shells and out of the perforate receptacle into the outer imperforate receptacle A, whence they run out at the outlet $r$ into a suitable holder (not shown) to be saved for use, storage or treatment (as by freezing) preparatory to storage.

What I claim as new, and desire to secure by Letters Patent, is—

1. The process of extracting the contents of eggs from their shells, which consists in subjecting any desired number of the eggs to be treated to the action of centrifugal force, substantially as described.

2. The process of extracting the contents of eggs from their shells, which consists in piling the eggs to be treated in a rotary, perforated receptacle, rapidly rotating the said receptacle, thereby breaking the shells and discharging their contents through the pile of shells and through the perforations in the receptacle, and gathering the discharged contents, substantially as described.

MARTIN J. POWER.

In presence of—
M. J. FROST,
M. E. WINN.